Dec. 15, 1925.
J. C. HENDERSON
1,565,363
DRAWING SHEET GLASS
Filed Aug. 7, 1922  3 Sheets-Sheet 3
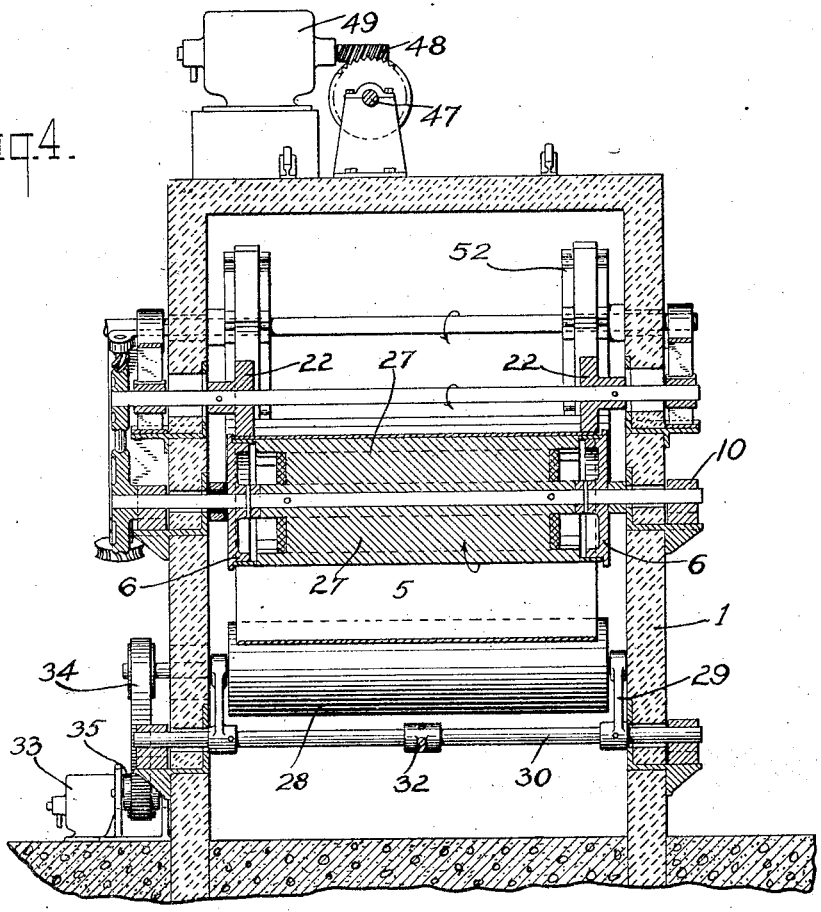
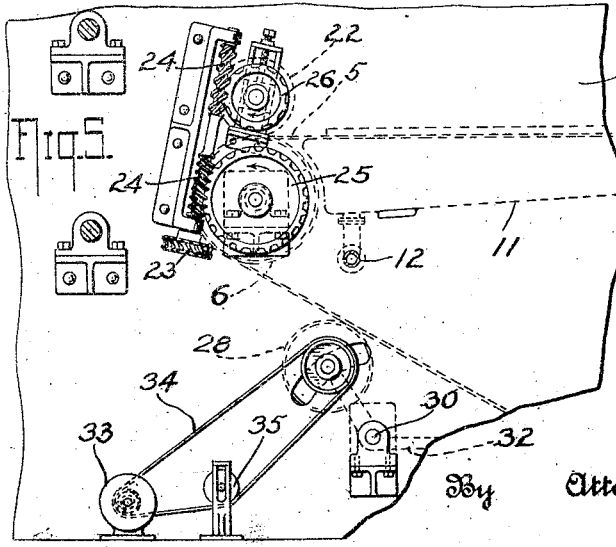
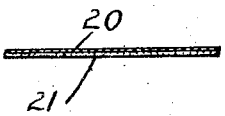
Inventor
JOHN C. HENDERSON.
By Attorney C. A. Rowley Patented Dec. 15, 1925.

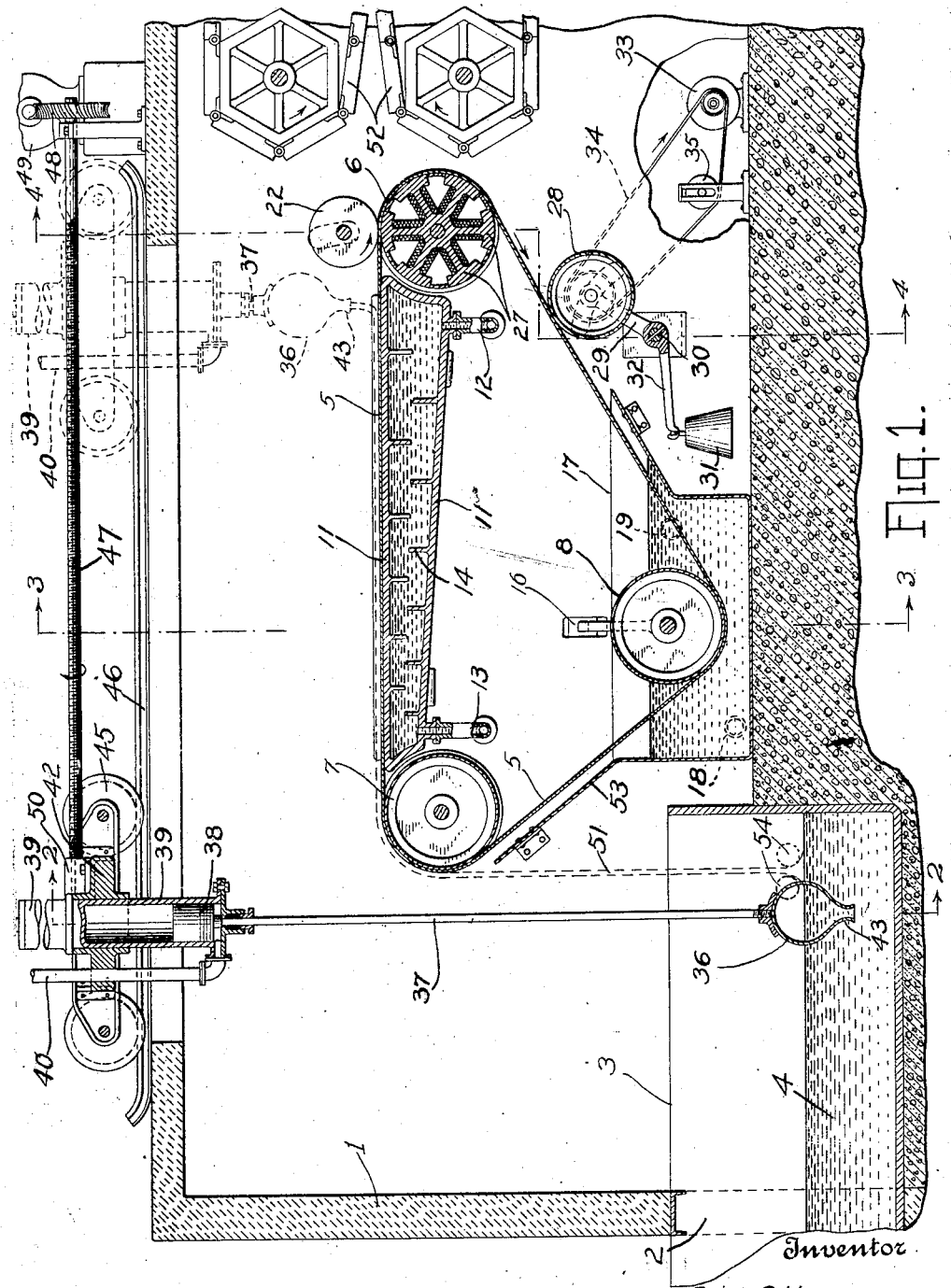

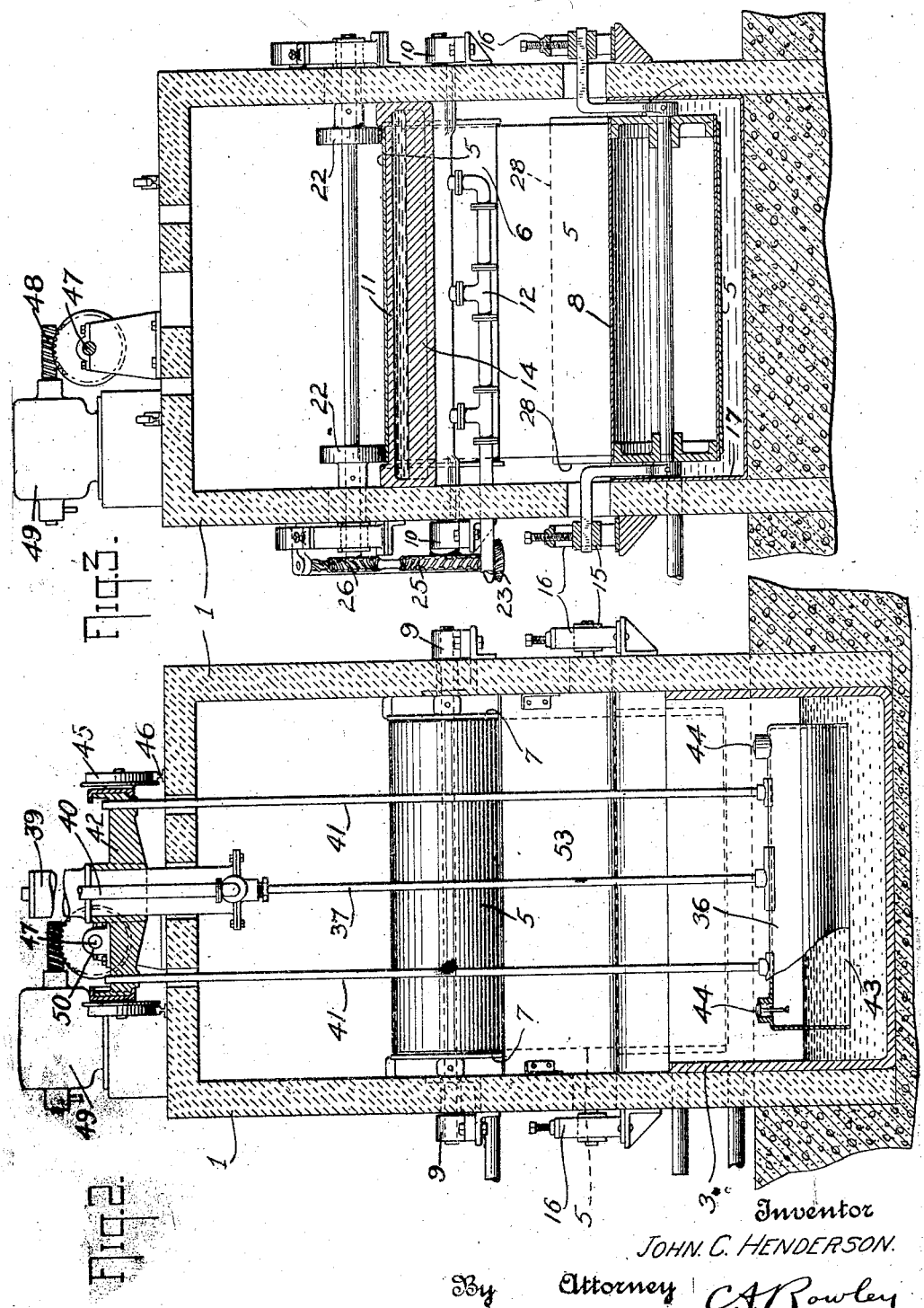

1,565,363

UNITED STATES PATENT OFFICE.

JOHN C. HENDERSON, OF NEW YORK, N. Y., ASSIGNOR TO THE LIBBEY-OWENS SHEET GLASS COMPANY, OF TOLEDO, OHIO, A CORPORATION OF OHIO.

DRAWING SHEET GLASS.

Application filed August 7, 1922. Serial No. 580,023.

*To all whom it may concern:*

Be it known that I, JOHN C. HENDERSON, a citizen of the United States, residing at New York, in the county of New York and State of New York, have invented new and useful Improvements in Drawing Sheet Glass, of which the following is a specification.

This invention relates to improvements in the art of producing a continuous flat sheet of glass, by drawing same from a supply of molten glass.

One of the objects is to provide an improved sheet drawing and conveying means, comprising an endless metallic belt. Improved mechanisms for supporting, driving, cooling and polishing this belt are also provided.

Another object is to provide an improved form of bait, for use in starting the sheet drawing process, and improved mechanism for operating the bait so as not to injure the sheet carrying surface of the conveyor.

Other objects and advantages will be apparent from the following detailed description of one embodiment of the invention.

In the accompanying drawings:

Fig. 1 is a vertical longitudinal section through the sheet drawing apparatus.

Fig. 2 is a vertical section taken substantially on the line 2—2 of Fig. 1.

Fig. 3 is a vertical section taken substantially on the line 3—3 of Fig. 1.

Fig. 4 is a vertical section taken substantially on the line 4—4 of Fig. 1.

Fig. 5 is a side elevation of a portion of the apparatus, the view being taken from the far side of Fig. 1.

Fig. 6 is a section through a portion of the belt.

Referring to the drawings, the wall of an elongated enclosing chamber is shown at 1, into which at 2, projects the pot or receptacle 3 containing the molten glass 4. This molten glass flows in from a continuous tank furnace or some other suitable source of supply. Any approved heating means may be used to maintain the glass in receptacle 3 at the proper temperature, but this heating mechanism as well as such burners or other heaters as might be found desirable at other points in the chamber 1 have not been illustrated.

An endless belt 5, upon which the glass sheet is drawn and flattened, is looped about three cylindrical rollers or drums 6, 7 and 8. The drum 7, which is preferably an idler, is mounted above the receptacle 3, and rotates freely in bearings 9. The drum 3, which is preferably the driver for the belt 5, is carried in bearings 10 at the sides of the chamber. The upper surfaces of the drums 6 and 7 are in substantial horizontal alignment, the upper run of the belt which is looped over these rollers or drums being substantially horizontal.

Beneath this upper horizontal sheet-supporting run of the belt 5, is a cooled supporting table 11, the same being hollow so that a circulation of cooling fluid may be maintained therethrough. The chamber of the supporting table 11 is of greater dimensions and capacity at its rear end than at its front end, and the water or other cooling medium is admitted at the rear entrance port 12 and passes out through the front discharge port 13. Baffles 14 within the chamber enforce a thorough circulation of the cooling fluid. It will be noted that there is a greater quantity of cooler water at the rear end of the table. This water is somewhat heated and is of smaller volume as it flows toward the front end of the table. In this way the temperature of the supporting table is graduated so that the glass sheet enters upon the warmer end and is gradually cooled as it is carried across the table.

The roller or drum 8 is carried in journals 15, mounted for vertical adjustment in brackets 16. The drum 8 is located in a tank 17, containing a cooling fluid, which enters through port 18 and flows out through port 19. The lower return run of the belt 5 passes around the drum 8 and is cooled by the liquid in tank 17. The belt 5 may be tightened by lowering the drum 8 within the belt loop.

The outer sheet carrying surface of the belt 5 is preferably a continuous sheet of polished metal 20, the same being lined on its inner surface with a covering 21 of woven asbestos or other fibrous material. This fibrous material takes up water from the tank 17, and keeps the belt relatively cool. The surface of the belt is composed of some metal or metallic alloy which is highly resistant to the corrosive effects due both to the temperature of the plastic glass sheet, and to the chemicals entering into its composition.

A suitable alloy for this purpose is what is known in the trade as "Monel" metal. Another suitable alloy is known as "nichrome". The former is composed substantially of nickel and copper, and the latter is a composition containing nickel, chromium and iron. The metallic surface of the belt should also be of a material which takes a high polish and retains it under conditions of use and these qualities are present in the alloys above referred to.

Adjustably mounted above the driving roller or drum 6 is a second driving roller 22, which is adapted to bear on the upper surface of the glass sheet, so that the sheet is gripped between the two drums or rollers 6 and 22. The drum 22 also holds the sheet down flat upon the supporting table 11, and in frictional drawing engagement therewith. The drum 22 may be continuous across the sheet, but is preferably in the form of a pair of side rollers engaging the edges only of the sheet, as shown in Fig. 3. The drums 6 and 22 are positively rotated from a drive-shaft 23, through worms 24 on the drive-shaft, and worm-wheels 25 and 26, keyed to the shafts of drums 6 and 22 respectively.

When the belt 5 is made of a metal which is susceptible to magnetic attraction, such as the alloys mentioned above, the driving pulley 6 may embody a series of electro-magnets 27. These magnets grip the metallic portion of the belt, and eliminate slippage between the drum and the belt.

Beneath the rear lower run of the belt is a buffing roller 28, swingingly mounted in arms or links 29, keyed on shaft 30. The roller 28 is yieldingly held in contact with the belt by means of weight 31 suspended on another arm 32, keyed to shaft 30. Buffing roller 28 is driven from motor 33, through a belt 34, which is kept at driving tension by an idler 35.

In order to start the drawing process, a suitable bait 36 is provided. This bait is carried by a piston rod 37, connected to a piston 38, within a cylinder 39, to which is connected an air-pipe 40 leading from a source of compressed air, so that the piston rod 37 and bait 36 can be raised and lowered as desired. The bait 36 is also provided with guide-rods 41, vertically slidable through passages in the carriage 42 on which the cylinder 39 of the compressed air motor is mounted.

The bait is preferably in the form of a hollow cylinder provided with a mouth having downwardly extending lips 43, and is also provided with check-valves 44.

In starting the apparatus the bait is lowered into the molten glass within the receptacle 3, the molten glass entering into the interior of the hollow cylindrical head and partially filling the same, the air being forced out through the check valves 44. Air is then admitted to the cylinder 39, through the pipe 40, and the bait is lifted until the lips 43 are somewhat above the level of the horizontal run of the belt 5. The carriage 42 which carries the compressed air motor 39, is mounted on wheels 45 which travel along rails 46. A horizontal screw-shaft 47, extending parallel with the rails 46, and driven through gearing 48 from motor 49, engages with a fixed nut 50 on the carriage 42. As the screw-shaft is rotated, the carriage will be drawn along the rails 46, and carry the bait and the glass sheet drawn thereby along and over the horizontal run of belt 5. As indicated by dotted lines in Fig. 1, the glass sheet 51 has been drawn up over and along the supporting belt 5 to a point near the rear end thereof. It will be noted that at no time does the bait or any of the metallic operating parts contact with the surface of belt 5. It is to be understood that the speeds of horizontal travel of the bait and the belt 5 will be equalized throughout this operation. When the bait has reached the position indicated in dotted lines in Fig. 1, the sheet is broken away from the bait and passes between the driving rollers 6 and 22. The sheet is then drawn off continuously, through any suitable conveying mechanism such as shown at 52, and into the annealing leer.

In order that the heat from the vertical run of the glass sheet shall not heat the lower run of the belt 5 unduly, a shield 53 is provided.

In normal operation the glass sheet is drawn up continuously from the molten glass 4 in receptacle 3, and is bent while still somewhat plastic over the belt 5 as it passes around drum 7, and is then carried on the belt 5 throughout the horizontal run of the belt. This portion of the belt is cooled from the supporting table 11, both to protect the belt material from the heat of the sheet, and also to gradually cool and set the sheet in flat form. The metallic belt is capable of being given a very high polish on its sheet-carrying surface, which will avoid any possible injury to the sheet surface carried thereon, and this polished surface is continually renewed and retained by means of the buffing roller 28, and also the cleansing effect of the cooling fluid through which the lower run of the belt passes.

Some suitable width-maintaining means for the sheet should be used, such as the edge-forming rollers indicated in dotted lines at 54, Fig. 1.

Claims:

1. In an apparatus for producing a continuous sheet of glass, the combination of a receptacle adapted to contain molten glass, and means to draw the glass sheet from this molten glass, including a belt mounted adjacent to the receptacle so as to provide a substantially horizontal sheet-supporting surface, and means for moving said belt so that said horizontal surface continually recedes from the receptacle a support located beneath the horizontal run of said belt, said support having a cooling chamber therein, and means for circulating a cooling medium through said chamber.

2. In an apparatus for producing a continuous sheet of glass, the combination of a receptacle adapted to contain molten glass, and means to draw the glass sheet from this molten glass, including a belt mounted adjacent to the receptacle so as to provide a substantially horizontal sheet-supporting surface, and means for moving said belt so that said horizontal surface continually recedes from the receptacle, a support located beneath the horizontal run of said belt, said support having a cooling chamber therein, and means for circulating a cooling medium through said chamber, including inlet and outlet ports so located that the cooling medium flows through the chamber in the direction opposite to the travel of the belt thereover.

3. In an apparatus for producing a continuous sheet of glass, the combination of a receptacle adapted to contain molten glass, and means to draw the glass sheet from this molten glass, including a belt mounted adjacent to the receptacle so as to provide a substantially horizontal sheet-supporting surface, and means for moving said belt so that said horizontal surface continually recedes from the receptacle, a support located beneath the horizontal run of said belt, said support having a cooling chamber therein, and means for circulating a cooling medium through said chamber, including inlet and outlet ports so located that the cooling medium flows through the chamber in the direction opposite to the travel of the belt thereover, the capacity of said chamber decreasing from the inlet end to the outlet end.

4. In an apparatus for producing a continuous sheet of glass, the combination of a receptacle adapted to contain molten glass, including a belt mounted adjacent to the receptacle so as to provide a substantially horizontal sheet-supporting surface, and means for moving said belt so that said horizontal surface continually recedes from the receptacle, and a tank containing cooling liquid through which the lower run of said belt moves, said belt having on its inner surface a lining of absorbent material.

5. In an apparatus for producing a continuous sheet of glass, the combination of a receptacle adapted to contain molten glass, and means to draw the glass sheet from this molten glass, including a belt mounted adjacent to the receptacle so as to provide a substantially horizontal sheet-supporting surface, and means for moving said belt so that said horizontal surface continually recedes from the receptacle, said means including a drum over which the belt is looped, said drum embodying means for producing magnetic poles adjacent its periphery, a portion of said belt being metallic and susceptible to magnetic attraction.

6. In an apparatus for producing a continuous sheet of glass, the combination with a receptacle adapted to contain molten glass, and means to draw the glass sheet from this molten glass, including a belt mounted adjacent to the receptacle so that its upper run provides a substantially horizontal sheet supporting surface, and means for moving said belt so that said horizontal surface continually recedes from the receptacle, of buffing means held against the outer surface of the lower run of said belt.

7. In an apparatus for producing a continuous sheet of glass, the combination with a receptacle adapted to contain molten glass, and means to draw the glass sheet from this molten glass, including a belt mounted adjacent to the receptacle so that its upper run provides a substantially horizontal sheet supporting surface, and means for moving said belt so that said horizontal surface continually recedes from the receptacle, of a buffing wheel beneath the lower run of said belt, means for yieldingly holding the buffing wheel in contact with the belt surface, and means for rotating said buffing wheel.

8. In a sheet glass drawing machine, a conveyor upon which the sheet is drawn and flattened, comprising a belt having a metallic outer sheet-supporting surface, and an inner lining of absorbent material.

9. In a sheet glass drawing machine, a conveyor upon which the sheet is drawn and flattened, comprising a belt having a metallic outer sheet-supporting surface, and an inner lining of absorbent material, and a tank containing a cooling liquid through which the belt moves while out of contact with the glass sheet.

10. In an apparatus for producing a continuous sheet of glass, the combination with a receptacle adapted to contain molten glass, of means to draw the glass sheet therefrom, comprising a belt having a substantially horizontal upper sheet-supporting run, an idler drum above the receptacle and a driven drum at a point remote from the receptacle, the upper run of the belt being carried by these drums, a tank containing a cooling fluid, and a third drum mounted in the tank.

about which the lower return run of the belt is looped.

11. In an apparatus for producing a continuous sheet of glass, the combination with a receptacle adapted to contain molten glass, of means to draw the glass sheet therefrom, comprising a belt having a substantially horizontal upper sheet-supporting run, an idler drum above the receptacle and a driven drum at a point remote from the receptacle, the upper run of the belt being carried by these drums, a tank containing a cooling fluid, and a third drum mounted in the tank, about which the lower return run of the belt is looped, this third drum being adjustable vertically to tighten the belt.

12. In an apparatus for producing a continuous sheet of glass, the combination with a receptacle adapted to contain molten glass, of means to draw the glass sheet therefrom, comprising a belt having a substantially horizontal upper sheet supporting run, an idler drum above the receptacle and a driven drum at a point remote from the receptacle, the belt being looped about these drums, and a driven roller mounted adjustably above the belt and the driven drum, and driven from the same source of power as the driven drum.

13. In an apparatus for drawing sheet glass, the combination with a receptacle adapted to contain molten glass, and means to draw the glass sheet therefrom, including a moving table or conveyor having a substantially horizontal sheet-supporting run, of a bait adapted to be partially submerged in the molten glass, and means for lifting said bait and carrying it rearwardly over and out of contact with the sheet supporting run of said conveyor to a point remote from the receptacle.

14. In an apparatus for drawing sheet glass, the combination with a receptacle adapted to contain molten glass, and means to draw the glass sheet therefrom, including a moving table or conveyor having a substantially horizontal sheet-supporting run, of a bait adapted to be partially submerged in the molten glass, motor means for elevating the bait to a point higher than the upper run of the table, and other means for transporting the bait and first motor means rearwardly above the table to a point remote from the receptacle.

15. In an apparatus for drawing sheet glass, the combination with a receptacle adapted to contain molten glass, and means to draw the glass sheet therefrom, including a moving table or conveyor having a substantially horizontal sheet-supporting run, of a bait adapted to be partially submerged in the molten glass, a carriage mounted for horizontal movement above the table, means for moving the carriage, and a fluid pressure motor mounted on the carriage for lifting the bait.

Signed at Harrison, in the county of Hudson and State of New Jersey, this 2nd day of August, 1922.

JOHN C. HENDERSON.